US011375468B2

(12) United States Patent
Small et al.

(10) Patent No.: US 11,375,468 B2
(45) Date of Patent: Jun. 28, 2022

(54) METHOD AND APPARATUS FOR SYNCHRONISING A LOCATION NETWORK

(71) Applicant: Locata Corporation Pty Ltd, Bruce (AU)

(72) Inventors: David Small, Numeralla (AU); Ian Sainsbery, Scullin (AU)

(73) Assignee: Locata Corporation Pty Ltd, Bruce (AU)

(*) Notice: Subject to any disclaimer, the term of this patent is extended or adjusted under 35 U.S.C. 154(b) by 165 days.

(21) Appl. No.: 16/980,421

(22) PCT Filed: Mar. 14, 2019

(86) PCT No.: PCT/AU2019/050229
§ 371 (c)(1),
(2) Date: Sep. 14, 2020

(87) PCT Pub. No.: WO2019/173875
PCT Pub. Date: Sep. 19, 2019

(65) Prior Publication Data
US 2021/0007075 A1 Jan. 7, 2021

(30) Foreign Application Priority Data
Mar. 14, 2018 (AU) .............................. 2018900841

(51) Int. Cl.
*H04W 56/00* (2009.01)
*G01S 1/02* (2010.01)
(Continued)

(52) U.S. Cl.
CPC ......... *H04W 56/0065* (2013.01); *G01S 1/024* (2013.01); *G01S 1/24* (2013.01);
(Continued)

(58) Field of Classification Search
CPC .......... H04W 56/0065; H04W 56/0015; G01S 1/024; G01S 1/24; G01S 1/304;
(Continued)

(56) References Cited

U.S. PATENT DOCUMENTS 7,616,682 B2 * 11/2009 Small .................... G01S 5/0081
  455/430
9,220,078 B1 * 12/2015 Bietz ....................... H04W 4/50
(Continued)

FOREIGN PATENT DOCUMENTS

WO    2016011505 A1    1/2016
WO    WO-2016011505 A1 *  1/2016  ............. G01S 1/024

OTHER PUBLICATIONS

"Locata: the positioning technology of the future?"; Barnes et al.; The 6th International Symposium on Satellite Navigation Technology Including Mobile Positioning & Location Services, Melbourne Australia, Jul. 22-25, 2003 (Year: 2003).*
(Continued)

*Primary Examiner* — Benjamin H Elliott, IV
(74) *Attorney, Agent, or Firm* — Mattingly & Malur, PC

(57) ABSTRACT

Apparatus and methods are presented for synchronising a slave device signal to a reference timebase, in situations where the slave device lacks knowledge of the propagation delay for signals from the reference device, e.g. if the positions of one or both of the devices are unknown or classified, or the inter-device signal propagation distance is otherwise a-priori unknown. Reference signal propagation delay is determined using an exchange of signals between the devices, with each device using a differencing procedure for eliminating effects of receiver line bias and other hardware delays. In another aspect an exchange of signals between the devices is used to detect a time residual arising from an inaccurate propagation delay estimate. The synchronisation methods can be applied to a plurality of slave (Continued)

devices for providing a synchronised location network. In certain embodiments signals are transmitted wirelessly, while in other embodiments they are transmitted via a fixed line.

16 Claims, 4 Drawing Sheets

(51) Int. Cl.
*G01S 1/24* (2006.01)
*G01S 1/30* (2006.01)
*G01S 5/14* (2006.01)
*H04L 7/00* (2006.01)

(52) U.S. Cl.
CPC ............... *G01S 1/304* (2013.01); *G01S 5/14* (2013.01); *H04L 7/0075* (2013.01); *H04W 56/0015* (2013.01)

(58) Field of Classification Search
CPC . G01S 5/14; G01S 1/08; H04L 7/0075; H04L 5/0048; H04L 5/0094; H04L 7/00
See application file for complete search history.

(56) References Cited

U.S. PATENT DOCUMENTS

| | | | | |
|---|---|---|---|---|
| 2005/0001742 | A1* | 1/2005 | Small | G01S 19/23 342/357.62 |
| 2007/0040739 | A1* | 2/2007 | Small | G01S 5/021 342/357.42 |
| 2008/0129591 | A1* | 6/2008 | Lamance | G01S 19/05 342/357.42 |
| 2009/0002238 | A1* | 1/2009 | Small | H04W 56/0015 342/464 |
| 2010/0020909 | A1* | 1/2010 | Jung | H04J 3/0667 375/371 |
| 2011/0170527 | A1* | 7/2011 | Yamamoto | H04W 56/0035 370/338 |
| 2021/0007075 | A1* | 1/2021 | Small | G01S 1/24 |

OTHER PUBLICATIONS

"Location Technologies for Mobile Networks"; Kos et al.; 2007 14th International Workshop on Systems, Signals and Image Processing and 6th EURASIP Conference focused on Speech and Image Processing, Multimedia Communications and Services; Jun. 27-30, 2007 (Year: 2007).*
Supplementary European Search Report for Application No. 19767865.9 dated Nov. 29, 2021.

* cited by examiner

METHOD AND APPARATUS FOR SYNCHRONISING A LOCATION NETWORK

FIELD OF THE INVENTION

The present invention relates to methods and apparatus for synchronising a location network, in particular in situations where the positions of the network devices are unknown or classified, or where the inter-device signal propagation distances are otherwise a priori unknown. However it will be appreciated that the invention is not limited to this particular field of use.

RELATED APPLICATIONS

The present application claims priority from Australian provisional patent application No 2018900841, filed on 14 Mar. 2018, the contents of which are incorporated herein by reference in their entirety.

BACKGROUND OF THE INVENTION

Any discussion of the prior art throughout this specification should in no way be considered as an admission that such prior art is widely known or forms part of the common general knowledge in the field.

U.S. Pat. No. 7,616,682 discloses methods and systems for generating precise position determinations for a mobile apparatus using positioning signals transmitted from a synchronised network of ground-based transmitters, known as positioning-unit devices, in known and fixed locations. Key to these methods and systems is the measurement and correction of timing errors in each positioning-unit device with respect to a designated reference device, which may itself be a positioning-unit device, thereby establishing and maintaining a network of positioning-unit devices transmitting positioning signals which are synchronised to the timebase of the reference device. Once a given positioning-unit device has been synchronised to the timebase of the reference device, it can relay that timebase to further positioning-unit devices that do not have a clear view of the reference device, thereby propagating the reference timebase through an extended network of positioning-unit devices. A mobile apparatus can then determine its position by applying known spread spectrum techniques to signals received from a number of positioning-unit devices, and possibly also from the reference device.

The synchronisation methods disclosed in U.S. Pat. No. 7,616,682 require each positioning-unit device to account for the propagation delay for reference signals transmitted from the reference device, which it typically calculates by dividing the geometric distance, i.e. straight-line distance between the respective antennas, by the speed of light. The positioning-unit devices are expected to know the geometric distances a priori, e.g. from prior surveying of their own antenna positions and that of the reference device antenna positions, with the reference device able to broadcast its antenna position as part of the data component of its signal.

There are however situations where it may be impractical or impossible for a positioning-unit device to have a priori knowledge of the geometric distance to the reference device. For example the positions of the reference device or the positioning-unit device may be unknown, or it may be impermissible or undesirable for the reference device to broadcast its position. The accuracy of the prior art synchronisation methods will also be compromised if the geometric distance does not represent the actual propagation path for signals from the reference device, e.g. because of multipath or if the signals are propagated through fixed lines.

There exists a need for improved methods and apparatus for synchronising the signal of a positioning-unit device to the timebase of a reference device. In particular, there is a need to be able to measure the propagation delay for reference signals being transmitted from a reference device to a positioning-unit device when the geometric distance or propagation delay is unknown.

Definitions

In the description herein and in the claims that follow, the terms 'comprising', 'comprises' and the like are to be interpreted in an inclusive sense, synonymous with the terms 'including', 'includes' and the like. For example the expression 'an apparatus comprising A and B' should not be limited to apparatus consisting only of elements A and B. Similarly, the term 'or' is to be interpreted in an inclusive rather than an exclusive sense. For example unless the context clearly requires otherwise, the expression 'A or B' is to be interpreted as meaning A, or B, or both A and B.

Object of the Invention

It is an object of the present invention to overcome or ameliorate at least one of the disadvantages of the prior art, or to provide a useful alternative. It is an object of the present invention in a preferred form to provide a method and apparatus for synchronising the signal of a positioning-unit device to the timebase of a reference device, in situations where the positions of one or both of the devices are unknown or classified, or where the reference signal propagation delay is otherwise a priori unknown.

SUMMARY OF THE INVENTION

According to a first aspect of the present invention there is provided a method for synchronising a second signal generated and transmitted by a second device to a timebase of a first device, said method comprising the steps of:
 (i) said first device generating and transmitting a first signal comprising first time information indicating the time of transmission of said first signal according to the timebase of said first device;
 (ii) said second device:
   (a) receiving and interpreting said first signal;
   (b) generating and transmitting said second signal comprising second time information indicating the time of transmission of said second signal;
   (c) receiving and interpreting said second signal;
   (d) calculating a first time difference between said first time information and said second time information; and
   (e) adjusting the generation of said second signal according to said first time difference, thereby adjusting said second signal and said second time information;
 (iii) said first device:
   (a) receiving and interpreting said first signal and the adjusted second signal;
   (b) calculating a second time difference between said first time information and the adjusted second time information; and
   (c) transmitting said second time difference, or a quantity related thereto; and (iv) said second device:
  (a) receiving said second time difference or the related quantity and obtaining therefrom a measure of the propagation delay of said first signal; and
  (b) adjusting the generation of said second signal according to said measure of said propagation delay,
thereby synchronising said second signal to said timebase.

Step (ii) (e) preferably comprises adjusting the generation of the second signal so as to minimise the difference between the first time information and the second time information.

Preferably, the method further comprises the steps of the first device after the second signal has been synchronised to the timebase:
  receiving and interpreting the second signal and the first signal;
  measuring a phase or time difference between the received and interpreted first and second signals; and
  transmitting the measured phase or time difference or a related quantity,
  such that the second device can adjust the generation of the second signal to mitigate the effect on the synchronisation of the second signal to the timebase of environment-related variations in the propagation of the first signal.

More preferably, the second device adjusts the generation of the second signal according to the measured phase or time difference or related quantity.

In certain embodiments the first and second signals are transmitted between the first and second devices via a fixed line. The fixed line may comprise a coaxial cable or an optical fibre.

In certain embodiments the method further comprises the step of broadcasting, from a transmitter operatively associated with the second device, a third signal that is synchronised with the timebase.

According to a second aspect of the present invention there is provided, in an apparatus in which a second device generating and transmitting a second signal has nominally synchronised said second signal to the timebase of a first device generating and transmitting a first signal, using a nominal value for the propagation delay of said first signal from said first device to said second device, a method for identifying a time residual between said second signal and said timebase, said method comprising the steps of said first device:
  a) receiving and interpreting said first signal and said second signal;
  b) measuring a time difference between the received first signal and the received second signal, from which said time residual can be calculated; and
  c) transmitting the measured time difference or a related quantity, such that said time residual can be corrected or compensated for.

In preferred embodiments the second device utilises the measured time difference or related quantity to adjust the generation of the second signal, thereby improving the accuracy of the synchronisation of the second signal to the timebase.

In other embodiments a third device utilises the measured time difference or related quantity to apply a correction to signals received from the second device.

In certain embodiments the method further comprises the steps of the first device after the second device has adjusted the generation of the second signal:
  receiving and interpreting the second signal and the first signal;
  measuring a phase or time difference between the received and interpreted first and second signals; and
  transmitting the measured phase or time difference or a related quantity, such that the second device can adjust the generation of the second signal to mitigate the effect on the synchronisation of the second signal to the timebase of environment-related variations in the propagation of the first signal.

According to a third aspect of the present invention there is provided an apparatus for synchronising a second signal generated and transmitted by a second device to a timebase of a first device, said apparatus comprising:
  a first device having a first timebase, configured to generate and transmit a first signal comprising first time information indicating the time of transmission of said first signal according to said first timebase; and
  a second device configured to:
    receive and interpret said first signal;
    generate and transmit a second signal comprising second time information indicating the time of transmission of said second signal;
    receive and interpret said second signal;
    calculate a first time difference between said first time information and said second time information; and
    adjust the generation of said second signal according to said first time difference, thereby adjusting said second signal and said second time information;
  wherein said first device is further configured to:
    receive and interpret said first signal and the adjusted second signal;
    calculate a second time difference between said first time information and the adjusted second time information; and
    transmit said second time difference, or a quantity related thereto;
  and wherein said second device is further configured to:
    receive said second time difference or the related quantity and obtain therefrom a measure of the propagation delay of said first signal; and
    adjust the generation of said second signal according to said measure of said propagation delay,
  thereby synchronising said second signal to said timebase.

Preferably, the second device is configured to adjust the generation of the second signal according to the first time difference so as to minimise the difference between the first time information and the second time information.

Preferably, the first device is configured to, after the second signal has been synchronised to the timebase:
  receive and interpret the second signal and the first signal;
  measure a phase or time difference between the received and interpreted first and second signals; and
  transmit the measured phase or time difference or a related quantity,
  such that the second device can adjust the generation of the second signal to mitigate the effect on the synchronisation of the second signal to the timebase of environment-related variations in the propagation of the first signal.

More preferably, the second device is configured to adjust the generation of the second signal according to the measured phase or time difference or related quantity.

In certain embodiments the first and second devices are configured to transmit and receive the first and second signals via a fixed line connecting the first and second devices. The fixed line may comprise a coaxial cable or an optical fibre.

In certain embodiments the apparatus further comprises a transmitter operatively associated with the second device, for broadcasting a third signal that is synchronised with the timebase.

According to a fourth aspect of the present invention there is provided an apparatus for identifying a time residual between a second signal generated and transmitted by a second device and a timebase of a first device generating and transmitting a first signal, said second device having nominally synchronised said second signal to the timebase using a nominal value for the propagation delay of said first signal from said first device to said second device, wherein said first device is configured to:
  receive and interpret said second signal and said first signal;
  measure a time difference between the received first signal and the received second signal, from which said time residual can be calculated; and
  transmit the measured time difference or related quantity, such that said time residual can be corrected or compensated for.

In preferred embodiments the second device is configured to utilise the measured time difference or related quantity to adjust the generation of the second signal, thereby improving the accuracy of the synchronisation of the second signal to the timebase.

In other embodiments the apparatus comprises a third device configured to utilise the measured time difference or related quantity to apply a correction to signals received from the second device.

In certain embodiments the first device is configured to, after the second device has adjusted the generation of the second signal:
  receive and interpret the second signal and the first signal;
  measure a phase or time difference between the received and interpreted first and second signals; and
  transmit the measured phase or time difference or a related quantity,
such that the second device can adjust the generation of the second signal to mitigate the effect on the synchronisation of the second signal to the timebase of environment-related variations in the propagation of the first signal.

According to a fifth aspect of the present invention there is provided, in an apparatus in which a second device generating and transmitting a second signal has synchronised said second signal to the timebase of a first device using a first signal generated and transmitted by said first device, a method for mitigating the effect on the synchronisation of environment-related variations in the propagation of said first signal, said method comprising the steps of:
  (i) said first device receiving and interpreting said second signal and said first signal;
  (ii) said first device measuring a phase or time difference between the received and interpreted first and second signals;
  (iii) said first device transmitting the measured phase or time difference or a related quantity; and
  (iv) said second device adjusting the generation of said second signal according to the measured phase or time difference or the related quantity, such that the synchronisation of said second signal to said timebase is maintained.

According to a sixth aspect of the present invention there is provided an apparatus for mitigating the effect, on the synchronisation of a second signal generated and transmitted by a second device to the timebase of a first device generating and transmitting a first signal, of environment-related variations in the propagation of said first signal, wherein said first device is configured to:
  receive and interpret said second signal and said first signal;
  measure a phase or time difference between the received and interpreted first and second signals; and
  transmit the measured phase or time difference or a related quantity;
and said second device is configured to:
  adjust the generation of said second signal according to the measured phase or time difference or the related quantity, such that the synchronisation of said second signal to said timebase is maintained.

According to a seventh aspect of the present invention there is provided a method for determining the position of a roving position receiver in a location network comprising a reference device having a timebase, and a plurality of positioning-unit devices generating and transmitting positioning signals synchronised to the timebase of said reference device, wherein at least one of said positioning-unit devices synchronises its positioning signal to said timebase by:
  (i) said reference device generating and transmitting a reference signal comprising first time information indicating the time of transmission of said reference signal according to said timebase;
  (ii) said positioning-unit device:
    (a) receiving and interpreting said reference signal;
    (b) generating and transmitting said positioning signal comprising second time information indicating the time of transmission of said positioning signal;
    (c) receiving and interpreting said positioning signal;
    (d) calculating a first time difference between said first time information and said second time information; and
    (e) adjusting the generation of said positioning signal according to said first time difference, thereby adjusting said positioning signal and said second time information;
  (iii) said reference device:
    (a) receiving and interpreting said reference signal and the adjusted positioning signal;
    (b) calculating a second time difference between said first time information and the adjusted second time information; and
    (c) transmitting said second time difference, or a quantity related thereto; and
  (iv) said positioning-unit device:
    (a) receiving said second time difference or the related quantity and obtaining therefrom a measure of the propagation delay of said reference signal; and
    (b) adjusting the generation of said positioning signal according to said measure of said propagation delay, thereby synchronising said positioning signal to the timebase of said first device,
  and wherein said roving position receiver calculates a position solution using a selection of positioning signals received from said plurality of positioning-unit devices, including the positioning signal received from the at least one positioning-unit device.

According to an eighth aspect of the present invention there is provided a location network for enabling a roving position receiver to calculate a position solution, said location network comprising:
  a reference device configured to generate and transmit a reference signal comprising time information indicating the time of transmission of said reference signal according to a timebase of said reference device; and a plurality of positioning-unit devices generating and transmitting positioning signals synchronised to the timebase of said reference device, wherein at least one of said positioning-unit devices is configured to:

receive and interpret said reference signal;

generate and transmit a positioning signal comprising second time information indicating the time of transmission of said positioning signal;

receive and interpret said positioning signal;

calculate a first time difference between said first time information and said second time information; and adjust the generation of said positioning signal according to said first time difference, thereby adjusting said positioning signal and said second time information;

and wherein said reference device is configured to:

receive and interpret said reference signal and the adjusted positioning signal;

calculate a second time difference between said first time information and the adjusted second time information; and transmit said second time difference or a quantity related thereto;

and wherein the at least one positioning-unit device is configured to:

receive said second time difference or the related quantity and obtain therefrom a measure of the propagation delay of said reference signal; and adjust the generation of said positioning signal according to said measure of said propagation delay, thereby synchronising said positioning signal to the timebase of said first device, such a roving position receiver is able to calculate a position solution using a selection of positioning signals received from said plurality of positioning-unit devices, including the positioning signal received from the at least one positioning-unit device.

According to a ninth aspect of the present invention there is provided an article of manufacture comprising a non-transitory computer useable medium having a computer readable program code configured to conduct the method according to the first, second, fifth or seventh aspects, or to operate the apparatus according to the third, fourth or sixth aspects, or to operate the location network according to the eighth aspect.

BRIEF DESCRIPTION OF THE DRAWINGS

Preferred embodiments of the invention will now be described, by way of example only, with reference to the accompanying drawings in which.

DETAILED DESCRIPTION

Wireless Embodiments

Figure 1:
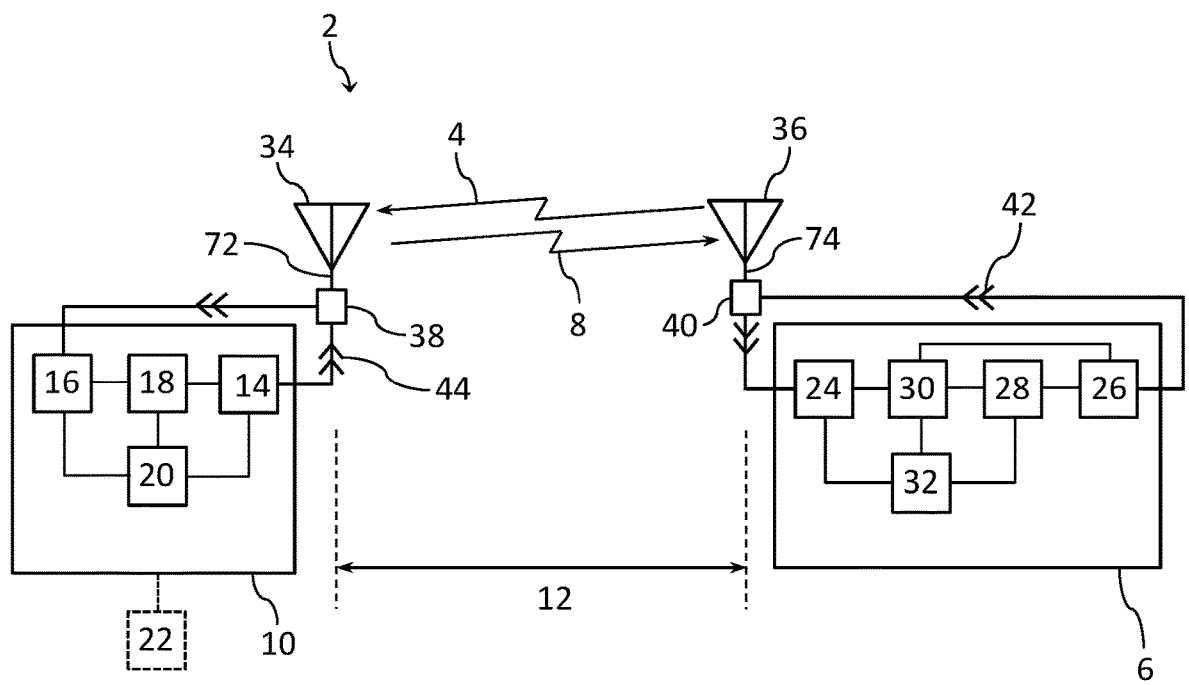
FIG. 1 illustrates in schematic form an apparatus for synchronising the signal of a positioning-unit device or slave device to the timebase of a reference device, according to an embodiment of the invention.

FIG. 1 depicts in schematic form an apparatus 2 suitable for synchronising a signal 4 transmitted from a second, slave device 6 to the timebase of a first, reference device 10, for the case of wireless transmission for example in the 2.4 GHz ISM band. Significantly, there is no requirement for a priori knowledge of the distance 12 between the antennas 34, 36 of the two devices.

In the embodiment illustrated in FIG. 1 the reference device 10 comprises a transmitter 14, a receiver 16, a CPU 18, and an oscillator 20 that provides a frequency standard to the transmitter 14. In the illustrated embodiment the oscillator 20 also feeds the receiver 16 and the CPU 18, while in other embodiments these components utilise their own oscillators. The CPU 18 comprises circuitry and non-transitory machine-readable program code for communication with the transmitter 14, the receiver 16 and the oscillator 20. In preferred embodiments the transmitter 14 comprises an RF carrier generator for generating a carrier frequency related to the frequency of the oscillator 20, e.g. some multiple or fraction thereof, and at least one pseudorandom number (PRN) code generator for generating a unique code sequence that can be distinguished from other code sequences transmitted on the same carrier frequency, e.g. by one or more slave devices 6. Consequently a reference signal 8 generated by the reference device 10 typically has a carrier component and a PRN code component, as well as a data component for conveying data from the CPU 18, including time information indicating the reference signal's time of transmission, which can be equated with the timebase of the reference device 10. In this embodiment the reference device timebase will be determined by the phase and frequency of the oscillator 20, the PRN component generated by the transmitter 14 and the data component generated by the CPU 18, plus any hardware delays before the reference signal 8 emanates from the reference device 10.

In certain embodiments, e.g. for use in a self-contained synchronised location network, the absolute accuracy and stability of the reference oscillator 20 are not critical and a temperature-compensated crystal oscillator (TCXO) may be used for example. In another embodiment the reference oscillator 20 is replaced by an external frequency reference 22 such as an atomic clock, which may be steered to Universal Coordinated Time (UTC) via GPS signals or similar. This external frequency reference 22 may for example provide a 10 MHz reference signal and pulse-persecond (PPS) to the transmitter 14, plus time information to the reference CPU 18, to transfer a timebase to the reference device 10.

The slave device 6 typically comprises a receiver 24, a transmitter 26 with a steered oscillator 28, and a CPU 30. Preferably the slave device 6 also comprises an oscillator 32 for providing a common frequency for the other components. The CPU 30 comprises circuitry and non-transitory machine-readable program code for communication with the transmitter 26, the receiver 24, and the steered oscillator 28. In preferred embodiments the steered oscillator is generated in the digital domain using digitally controlled oscillators, fractional-N Phase Lock Loops, or Direct Digital Synthesis (DDS) techniques. These digitally generated oscillators can be frequency controlled to µHz accuracies, thus allowing the slave signal 4 to be precisely 'slaved' to the reference device timebase in the synchronisation process described below. In preferred embodiments the slave transmitter 26 comprises an RF carrier generator for generating a carrier frequency related to the frequency of the steered oscillator 28, e.g. some multiple or fraction thereof, and at least one pseudo-random number (PRN) code generator for generating a unique code sequence that can be distinguished from other code sequences transmitted on the same carrier frequency, e.g. by the reference device or other slave devices in a location network. Consequently a signal 4 generated by the slave device 6 typically has a carrier component and a PRN code component, as well as a data component for conveying data from the CPU 30, along with time information indicating the signal's time of transmission. Generally, the time of transmission of the slave signal 4 will be determined by the phase and frequency of the steered oscillator 28, the PRN component generated by the transmitter 26 and the data component generated by the CPU 30, plus any hardware delays before the slave signal 4 emanates from the slave device 6.

In the illustrated embodiment the reference device 10 and the slave device 6 are each equipped with a single element antenna 34, 36 such as an omnidirectional antenna for both transmitting and receiving signals 4, 8, and Tx/Rx switches 38, 40 for toggling the respective devices between transmit and receive modes. In alternative embodiments RF circulators or similar components are used instead of Tx/Rx switches. The ability of the reference device 10 to transmit and receive signals through a common antenna 34, and likewise the ability of the slave device 6 to transmit and receive signals through a common antenna 36, is advantageous because it ensures that the reference and slave signals 8, 4 traverse symmetric paths. Consequently the times-of-flight or propagation delays for the reference and slave signals 8, 4 can both be taken to be equal to half of the round-trip propagation delay, irrespective of whether the signals are affected by multipath. In an alternate embodiment separate transmit and receive antennas (not shown) are used for the reference device 10 or the slave device 6, however in this case multipath may not be symmetric.

In situations where the reference signal propagation delay is a priori unknown, in a preferred embodiment synchronisation of a slave signal 4 to the timebase of a reference device 10, or more precisely synchronisation of the time of transmission of a slave signal 4 to the time of transmission of a reference signal 8 transmitted from a reference device, i.e. the timebase of the reference device 10, is achieved in the following stages:

Stage 1: Acquisition of Reference Signal and Transmission of Slave Signal

The slave device 6 receives the reference signal 8 including time information indicating the time of transmission of the reference signal, i.e. the reference device timebase. The slave device 6 coarsely sets the slave transmitter 26 time and frequency to the time and frequency of the received reference signal 8, then generates and transmits a slave signal 4. The slave transmitter 26 includes in the slave signal 4 time information indicating the time of transmission, which at this stage is coarsely aligned with respect to the received reference signal 8. The slave signal 4 also includes data informing the reference device 10, and any other recipient device, that the slave device 6 is in an initial alignment mode.

Stage 2: Fine Frequency Alignment of Slave Signal to Reference Signal

The slave receiver 24 receives the slave signal 4 as indicated by the feedback loop 42, as well as the reference signal 8, interprets these signals in separate channels according to their respective carrier phases, PRN codes and data components, and measures a frequency difference between these signals. The slave CPU 30 then adjusts the frequency of the steered oscillator 28 by an amount derived from the measured frequency difference. In preferred embodiments the measured frequency difference is in the form of an integrated carrier phase (ICP) difference, and the slave CPU 30 zeros the ICP measurements of both signals within the receiver 24 then engages a closed ICP control loop that continuously applies corrections to the steered oscillator 28 to maintain the ICP difference at zero, locking the frequency of the slave signal 4 to the frequency of the reference signal 8.

Stage 3: Mirror Mode

Once the slave signal 4 is finely frequency aligned with the reference signal 8, the time information derived from the carrier phase, PRN code and data components of the respective signals can be filtered and measured. The slave CPU 30 calculates a first time difference, being the time difference between the respective time information in the slave and reference signals 4, 8, then adjusts the generation of its signal 4 according to the calculated first time difference. Preferably, the slave CPU 30 adjusts the generation of its signal 4 so as to minimise the difference between the respective time information in the slave and reference signals 4, 8. That is, the generation of the slave signal 4 is preferably adjusted by an amount equal to the calculated first time difference, so as to bring the transmitted slave signal 4 into carrier phase, PRN code and data alignment with the received reference signal 8. Following this adjustment the slave signal 4 will be time-offset from the reference device timebase only by the as yet unknown reference signal propagation delay. Therefore the time information included in the adjusted slave signal 4 will be substantially identical to the time information in the reference signal 8 received by the slave device 6. At this stage the slave signal 4 is essentially an active reflection of the reference signal 8, with the same carrier phase, code phase and broadcast time information in the data component as the received reference signal, but with unique PRN code and data components. The slave device 6 subsequently broadcasts that it is metaphorically reflecting the reference signal, in a so called 'mirror mode', and waits for further information from the reference device 10.

Stage 4: Calculation and Broadcast of Reference Signal Propagation Delay

The reference receiver 16 receives the adjusted slave signal 4, along with the reference signal 8 as represented by the feedback loop 44, then interprets the slave and reference signals in separate channels according to their respective carrier phase, PRN codes, and data components. The reference CPU 18 confirms that the slave device 6 is in mirror mode then calculates a second time difference, being the time difference between the respective time information in the slave and reference signals 4, 8. Since the time information in the adjusted slave signal 4 corresponds to the time of transmission of the original reference signal 8 that was received by the slave device 6 and 'reflected' back to the reference device, the reference CPU 18 can interpret this second time difference as the round-trip propagation delay for signals between the reference and slave devices 10, 6. In preferred embodiments the reference CPU 18 applies an appropriate scaling factor to the calculated second time difference to obtain a measure of the reference signal propagation delay, and transmits that information to the slave device 6, preferably as part of the data component of the reference signal 8. For the case of symmetric signal paths, the scaling applied to the calculated second time difference generally involves division by a factor of approximately two, or equivalently multiplication by a factor of approximately one half, since the reference signal propagation delay is expected to be half the round-trip propagation delay. In alternative embodiments the reference device 10 transmits the calculated second time difference to the slave device 6, which then applies an appropriate scaling factor to obtain a measure of the reference signal propagation delay. In general terms, the reference device 10 measures and transmits to the slave device 6 the second time difference, i.e. the round-trip propagation delay, or a quantity related thereto, enabling the slave device 6 to obtain a measure of the reference signal propagation delay.

Stage 5: Correction for Reference Signal Propagation Delay

Once the slave device 6 has received the second time difference or related quantity transmitted from the reference device 10 and obtained a measure of the reference signal propagation delay, it re-enters alignment mode and applies the measure of the reference signal propagation delay as a further adjustment to its steered oscillator 28, thereby synchronising the slave signal 4 to the reference device timebase. In other words the generation of the slave signal 4 is advanced by the measured reference signal propagation delay to align with the reference device timebase, effectively transferring the reference device timebase to the slave device 6.

The slave device 6 then updates the data component of the slave signal 4 to indicate that synchronisation to the reference device timebase has been achieved. Other slave devices in view can proceed to use the slave signal 4 to synchronise their signals to the reference device timebase. In preferred embodiments this relaying of the reference device timebase can be 'daisy-chained' by repeating the above described synchronisation procedure, so that the slave device 6, which is now acting as a reference device, does not need to broadcast its position to subsequent slave devices. In certain embodiments, for cross-checking purposes the synchronised slave device 6 includes the determined reference signal propagation delay in the data component of its own signal 4.

In certain embodiments the generation of the slave signal is adjusted by applying frequency offsets to the steered oscillator 28 over specified time periods, which slew the slave signal 4 in time. In other embodiments the generation of the slave signal is adjusted by applying clock offsets to the PRN code generator of the slave transmitter 26 over specified time periods, which slew the slave signal 4 in time. If a closed ICP control loop is used to lock the frequency of the slave signal 4 to the frequency of the reference signal 8, the loop is preferably opened temporarily for the frequency offsets to be applied to the steered oscillator 28. After the frequency of the steered oscillator 28 has been offset, the slave CPU 30 preferably re-engages the closed ICP control loop to maintain the adjustment of the slave signal 4.

Figure 2:
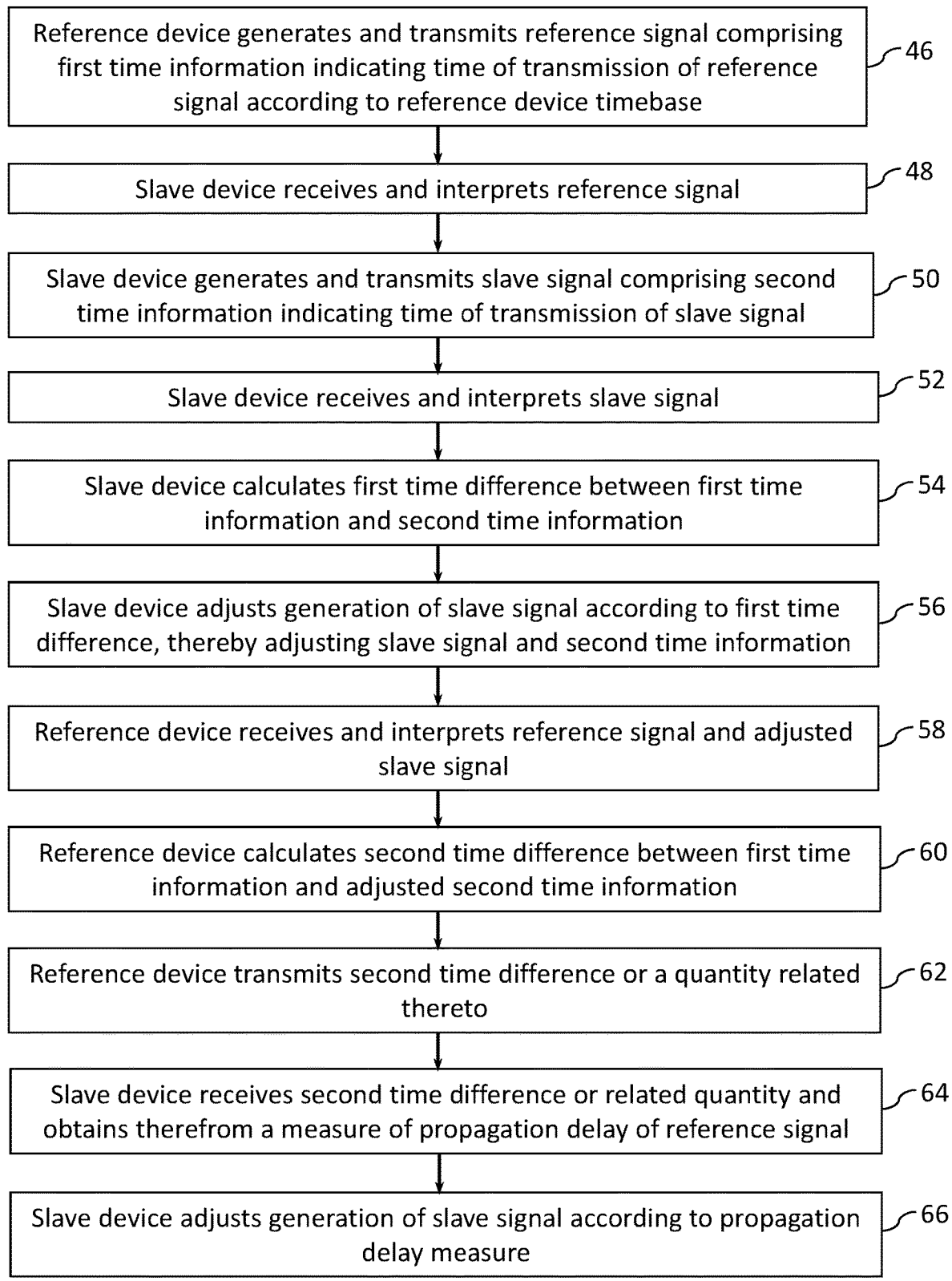
FIG. 2 shows a flowchart depicting a method for synchronising the signal of a positioning-unit device or slave device to the timebase of a reference device, according to an embodiment of the invention.

A method for synchronising the signal of a slave device to the timebase of a reference device is summarised in the flowchart of FIG. 2. In step 46 the reference device generates and transmits a reference signal comprising first time information indicating the time of transmission of the reference signal according to the reference device timebase. In step 48 the slave device receives and interprets the reference signal, then in step 50 the slave device generates and transmits a slave signal comprising second time information indicating the time of transmission of the slave signal. In step 52 the slave device receives and interprets the slave signal. The slave device calculates a first time difference between the first and second time information in step 54, then in step 56 the slave device adjusts the generation of the slave signal according to the first time difference, thereby adjusting the slave signal and the second time information. In step 58 the reference device receives and interprets the reference signal and the adjusted slave signal in separate channels, then in step 60 the reference device calculates a second time difference between the first time information and the adjusted second time information. In step 62 the reference device transmits the calculated second time difference or a quantity related thereto. In step 64 the slave device receives the calculated second time difference or the related quantity and obtains therefrom a measure of the propagation delay of the reference signal. Finally in step 66 the slave device adjusts the generation of the slave signal according to the propagation delay measure, thereby synchronising the slave signal to the reference device timebase. In a preferred embodiment the reference device transmits the calculated second time difference in step 62, and in step 64 the slave device obtains a measure of the reference signal propagation delay by dividing the second time difference by a scaling factor of approximately two.

The adjustment applied by the slave device 6 to the generation of the slave signal in step 56 is preferably selected to minimise the difference between the first and second time information by bringing the transmitted slave signal 4 into carrier phase, PRN code and data alignment with the received reference signal 8. In doing so, the slave device 6 is essentially ignoring the effect of the reference signal propagation delay. However it would also be possible for the slave device 6 to apply a different adjustment to the generation of its signal, provided that adjustment is communicated to the reference device 10. For example the slave device 6 may choose to apply an estimate for the reference signal propagation delay, e.g. to achieve an initial coarse synchronisation, in which case the second time difference calculated by the reference device 10 is a measure of a time residual, or synchronisation error, arising from inaccuracies in this propagation delay estimate. Assuming the signal paths for the reference and slave signals 8, 4 are symmetric, the error in the reference signal propagation delay can be taken to be half this value.

In an alternative embodiment where the objective is simply to determine the propagation delay for a signal 8 from the reference device 10 to the slave device 4, the method depicted in the flowchart of FIG. 2 can terminate after step 60.

Highly advantageous in the synchronisation procedure summarised in FIG. 2, and with reference to FIG. 1, are the feedback loops 42, 44 that enable each of the slave and reference devices 6, 10 to receive and interpret the slave and reference signals 4, 8 through the same circuitry. Preferably, within each device the slave and reference signals 4, 8 are received and interpreted substantially simultaneously. Noting that the slave and reference signals will typically be transmitted from the respective devices in a TDMA scheme, it will be appreciated that the 'substantially simultaneous' receiving and interpreting of different signals will depend on the details of the TDMA scheme. Common mode errors such as oscillator drift, temperature or voltage induced delay variations, and receiver line bias associated with the reference or slave device electronics, are eliminated in the differencing procedures, representing a significant advance over known ranging methods for determining a round-trip propagation delay, eliminating hardware error sources that can often be many nanoseconds, or even microseconds. Advantageously, the synchronisation process only requires a single exchange of signals between the slave device 6 and the reference device 10, imposing a minimal load on the data components of their respective signals. The feedback required for the loops 42, 44 can be conveniently provided by imperfect port isolation at the Tx/Rx switches 40, 38, with the 30 to 40 dB port isolation of typical RF Tx/Rx switches or other signal routing components such as RF circulators generally providing sufficient signal strength back to the respective receivers 24, 14 when the transmitters 26, 16 are transmitting signals 4, 8.

Figure 3:
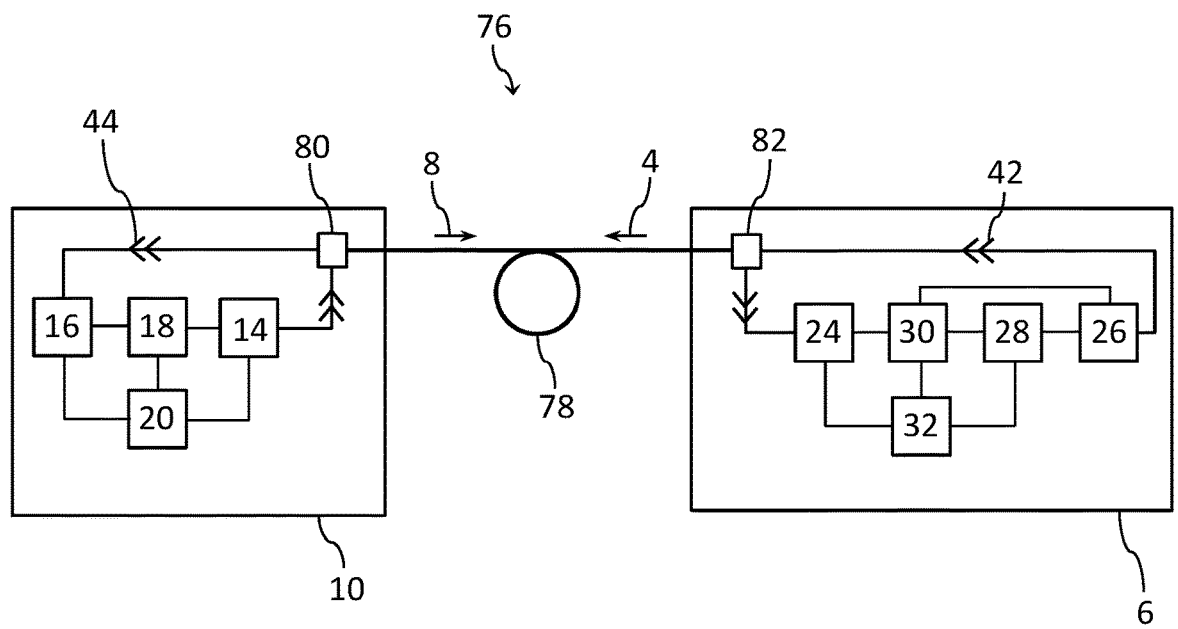
FIG. 3 illustrates in schematic form an apparatus for synchronising the signal of a positioning-unit device or slave device to the timebase of a reference device, according to an embodiment of the invention.

The cable lengths 72, 74 between the respective Tx/Rx switches 38, 40 and antennas 34, 36 are also common mode in the exchange of signals between the reference and slave devices 10, 6. It follows that the positions of the Tx/Rx switches 38, 40 are non-critical. They may for example be proximate to the antennas 34, 36 as shown in FIG. 1, or proximate to the transmitter, receiver and other components of the reference device 10 or slave device 6 as shown in FIG. 3.

Provided the frequency of the slave signal 4 has been locked to the frequency of the reference signal 8 as described previously, the synchronisation of the slave device signal 4 to the reference device timebase can be extremely stable over long time periods, unaffected by hardware drift in the slave device electronics. It is possible however that changes in tropospheric delay, generally associated with variations in temperature, pressure and relative humidity, may cause the slave device 6 to drift out of precise synchronisation. In particular, variations in tropospheric delay will gradually affect the phase, and subsequently time, of the reference signal 8 as received at the slave device 6. The ICP control loop of the slave device will follow this phase change, with the undesirable result being drift of the steered oscillator 28 relative to the reference oscillator 20. Over time, this will cause degradation of synchronisation as the timing of the slave signal 4 diverges from the reference device timebase. Environmental changes can also influence multipath, e.g. via changes in the moisture content of the ground, again affecting the phase of the reference signal 8 as received at the slave device.

To mitigate the effect on the synchronisation of the slave signal 4 to the reference device timebase of environment-related variations in the propagation of the reference signal, in certain embodiments the reference device 10 continues to monitor the slave device 6 after the slave device has declared synchronisation to the reference device timebase. To this end the reference receiver 16 continues to receive and interpret both the incoming slave signal 4 and the outgoing reference signal 8. In preferred embodiments the reference device 10 continually or periodically measures phase or time differences between the reference signal 8 and the slave signal 4 and periodically transmits phase or time corrections to the slave device 6 via the data component of the reference signal 8, or some other communications link (not shown). Any phase or time differences measured by the reference device 10 will be 'round trip' propagation delay residuals, generally equal to twice the required correction, assuming symmetric signal paths. The division by two can be performed by the reference device 10 or the slave device 6. Since tropospheric delay generally only varies gradually, typically on a timescale of minutes or tens of minutes, the reference device 10 need only provide phase or time corrections occasionally, e.g. every minute or every ten minutes. Corrections could of course be provided more frequently, e.g. every second, subject to constraints of the data link. If the reference device 10 has access to local meteorological data, e.g. from a co-located meteorological station, it may choose to measure and provide phase or time corrections when, say, the temperature, pressure or relative humidity changes by a predetermined amount. In alternate embodiments it is also possible for the reference device 10 to measure differences between other properties of the reference and slave signals 8, 4, such as frequency, and transmit appropriate corrections.

Once a slave device 6 has received phase or time corrections from the reference device 10 it can apply those corrections to maintain or improve synchronisation of the slave signal 4 to the timebase of the reference device. Since tropospheric or other environmental changes are generally gradual, any one correction is expected to be small, so the necessary adjustments are preferably applied directly into the integrated carrier phase (ICP) control loop.

In networks where a given reference device 10 is communicating with or tracking multiple slave devices 6, the reference device 10 will generally include device identification for the relevant slave device 6 associated with the phase or time corrections.

Figure 7:
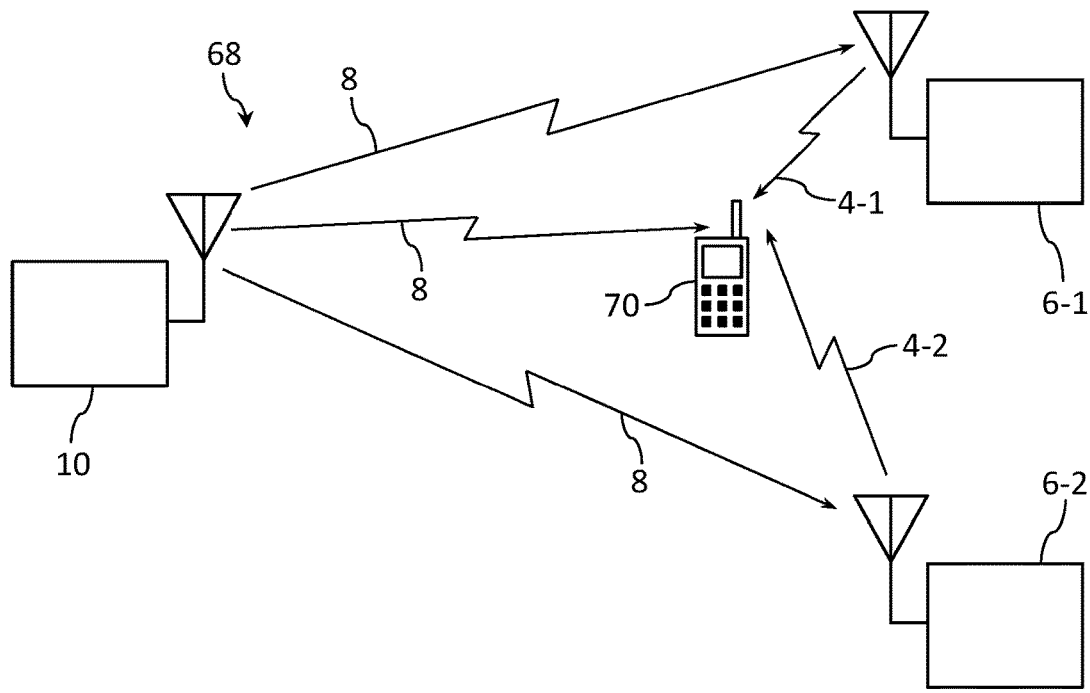
FIG. 7 shows in schematic form a location network in which a roving position receiver is able to determine its position using signals received from devices in the network.

For the purposes of synchronising a location network 68, depicted schematically in FIG. 7, it will be appreciated that the above-described synchronisation process can be performed between a designated reference device 10 and one or more of a plurality of 'slave' positioning-unit devices 6-1, 6-2, without any of the devices knowing or broadcasting their locations. A roving position receiver 70 can then calculate a position solution based on signals 4-1, 4-2 received from synchronised 'slave' positioning-unit devices 6-1, 6-2, and possibly also signals 8 from the reference device 10, using known spread spectrum techniques. These calculations require the roving position receiver 70 to know the locations of the devices 6-1, 6-2, 10 from which it receives signals 4-1, 4-2, 8. In situations where, for example, the locations of the reference device 10 or the 'slave' positioning-unit devices 6-1, 6-2 are classified, this can be achieved by pre-programming authorised roving position receivers 70 with the positions of the relevant devices.

Fixed Line Embodiments

FIG. 1 depicts a wireless apparatus in which a slave device 6 can synchronise a slave signal 4 to the timebase of a reference device 10 without a priori knowledge of the propagation delay for signals 8 from the reference device. This synchronisation process, with its differencing calculations that eliminate common mode errors such as hardware delay variations, is also well suited to signal transmission via fixed line of unknown or imprecisely known length. The fixed line may for example comprise a coaxial cable or an optical fibre link. One advantage of fixed line over wireless is the elimination of multipath. A second advantage is that a timebase can be transferred to locations that, for whatever reason, cannot receive wireless signals reliably. A particular advantage of optical fibre links is the possibility of timebase synchronisation over transnational or even transcontinental distances, e.g. to synchronise widely separated location networks to a common timebase.

FIG. 3 depicts in schematic form an apparatus 76 suitable for synchronising the signal 4 of a second, slave device 6 to the timebase of a first, reference device 10, for the case of transmission via a fixed line 78. In certain embodiments the fixed line 78 comprises a coaxial cable, with the transmitters 14, 26 and receivers 16, 24 of the reference and slave devices 10, 6 selected to operate in a suitable RF band. Generally speaking, lower frequencies have lower propagation loss in coaxial cables and would be suitable for synchronisation of signals over longer distances.

In other embodiments the fixed line 78 comprises an optical fibre, preferably a singlemode optical fibre although a multimode optical fibre may be suitable for relatively short distances. Operation around 1550 nm with telecommunications grade singlemode optical fibres typically allows transmission distances of up to 80 or 100 km without amplification. For longer distances the fixed line 78 may include one or more amplifiers, which in preferred embodiments are fully bidirectional to ensure symmetric signal paths in each direction. Each transmitter 14, 26 may for example comprise a combination of an RF transmitter and an RF to optical (E→O) convertor. Alternatively the transmitters may comprise semiconductor lasers modulated either directly or via external modulators such as electro-optic modulators. Preferably the two transmitters 14, 26 emit light of near-identical wavelengths to ensure symmetrical propagation, noting that the propagation speed of signals along an optical fibre typically varies with wavelength. If the wavelengths are significantly different, the resulting propagation asymmetry may be compensated to some extent using knowledge of the dispersion properties of the optical fibre. In certain embodiments the receivers 16, 24 each comprise a combination of an optical to RF (O→E) convertor and an RF receiver, while in other embodiments the receivers comprise fast photodiodes combined with suitable signal processing electronics.

Whatever the form of the fixed line 78, its length will often not be known, at least with the precision required for synchronisation of signals or devices at the nanosecond level. For example a 2 metre length of optical fibre with refractive index ~1.5 corresponds to 10 ns. This is analogous to the case of wireless transmission over an unknown distance 12 as described above with reference to FIG. 1. To solve this problem, the above-described synchronisation process can be applied to fixed line links, with the same general steps of frequency alignment, active reflection, round-trip propagation delay measurement and time alignment.

The reference and slave devices 10, 6 shown in FIG. 3 each contains an RF or optical switch 80, 82 connecting the device to the fixed line 78. These switches act in analogous fashion to the Tx/Rx switches 38, 40 shown in FIG. 1, selecting whether the reference or slave devices are operating in transmit or receive mode, and with imperfect port isolation providing the feedback loops 44, 42. Suitable RF switches include solid state semiconductor switches. Several types of optical switch with a range of switching speeds are known in the art, including opto-mechanical switches, electro-optic switches, acousto-optic switches and switches based on total internal reflection. In other embodiments the active RF or optical switches 80, 82 are replaced by passive components such as RF hybrid quadrature couplers or optical circulators. Either way, each of the reference and slave devices can receive and interpret both of the reference and slave signals 8, 4 as explained previously.

In the embodiment with wireless signals described above with reference to FIG. 1, it was explained how the reference device 10 can continue to monitor the slave device 6 after the slave has declared synchronisation, to correct drift of the slave steered oscillator 28 that may for example be caused by changes in tropospheric delay. Analogously, the effects of environmental changes on the fixed line, in particular temperature changes, will alter the phase, and subsequently time, of the reference signal 8 as received at the slave device 6 via the fixed line 78. Temperature changes may for example affect both the length of a fixed line and the propagation speed of signals along that line. The resulting drift can be corrected with essentially the same monitoring procedure. In preferred embodiments the reference device 10 continually or periodically measures phase, or time differences between the reference and slave signals 8, 4, and periodically transmits phase, or time corrections to the slave device 6. As described previously the slave device 6 can then apply any received phase, or time corrections to maintain or improve synchronisation of its signal 4 to the timebase of the reference device.

Figure 4:
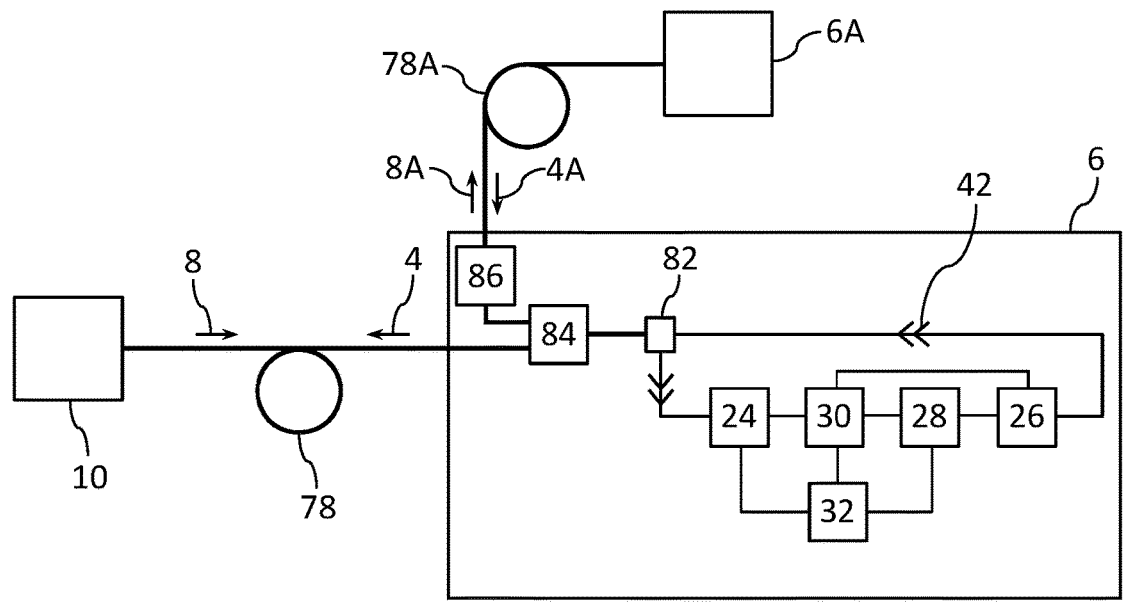
FIG. 4 shows in schematic form selected components of an apparatus in which a slave device transfers a timebase received from a reference device to a further slave device, using fixed line links.

As with the previously described wireless embodiment, once a slave device has been synchronised to the timebase of a reference device, it can cascade or relay that timebase to one or more further or secondary slave devices. FIG. 4 shows in schematic form a slave device 6 with an additional component in the form of a 1×2 splitter 84 that enables the timebase received from a reference device 10 along a fixed line 78 to be cascaded to a secondary slave device 6A via another fixed line 78A. In this embodiment the primary slave signal 4 becomes the new reference signal 8A, and the primary slave device 6 receives signals 4A from the secondary slave device 6A. The 1×2 splitter 84 is preferably a passive component rather than an active switch, so that the primary slave device 6 can transmit signals 4 and 8A to the reference device 10 and the secondary slave device 6A simultaneously rather than sequentially.

Generally speaking the secondary slave device 6A should only utilise the signal 8A once the primary slave device 6 has declared synchronisation with the reference device 10. Alternatively or additionally, the primary slave device 6 may contain an isolation switch 86 under control of the CPU 30 to prevent signal transmission along the fixed line 78A before the primary slave device has declared synchronisation. Preferably, any such optional components should be symmetric in the signal paths so as to be common mode.

In alternative embodiments the timebase obtained via synchronisation to a reference device is disseminated to multiple secondary slave devices, e.g. by replacing the 1×2 splitter 84 with a 1×N splitter or by using cascaded 1×2 splitters. 1×N splitters for various values of N, for operation in either the RF or optical domain, are known in the art. Inevitably, the power loss associated with the 1×N splitting will limit the number of secondary slave devices that can receive a timebase from a given primary slave device, unless the signals are amplified, preferably using bi-directional amplifiers for path symmetry.

Figure 5:
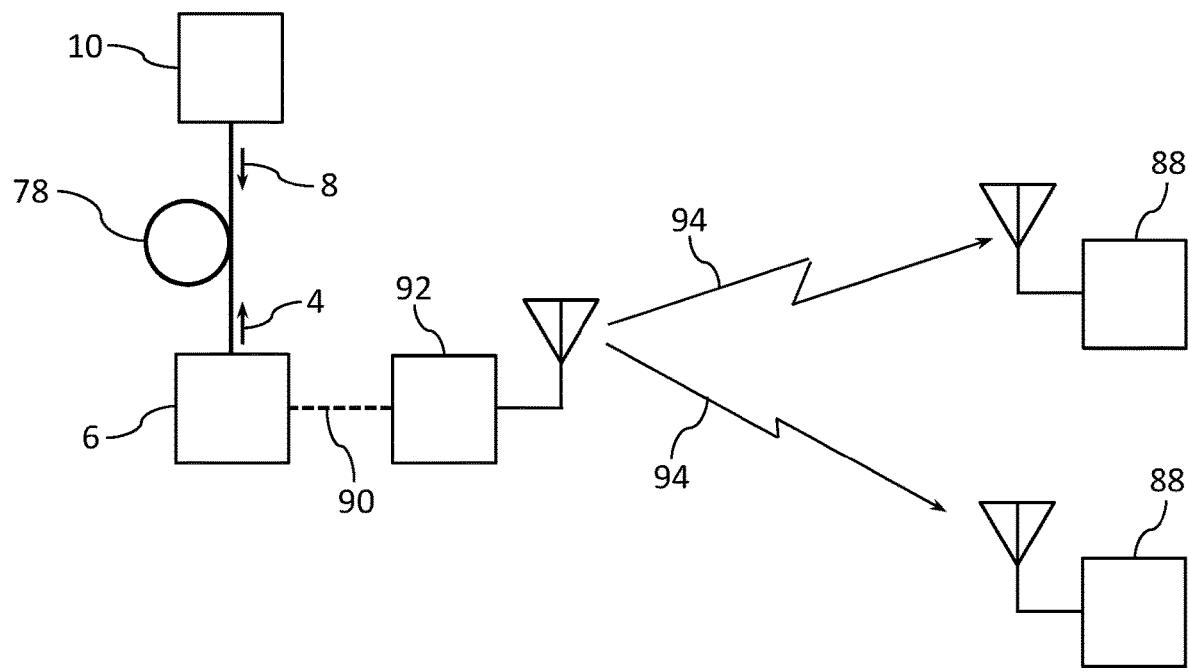
FIG. 5 shows in schematic form an apparatus in which a timebase transferred from a reference device to a slave device over a fixed line can be disseminated wirelessly to one or more other devices remote from the reference device.

FIG. 5 depicts in schematic form a variation of the fixed line apparatus shown in FIG. 3, in which a timebase transferred from a reference device 10 to a slave device 6 over a fixed line 78 such as a singlemode optical fibre can be disseminated wirelessly to any number of other devices 88 remote from the reference device. In this embodiment the apparatus additionally includes a transmitter 92 operatively associated with the slave device 6 for broadcasting a third signal 94 that is synchronised with the second, slave timebase. Generally the reference device timebase will already have been transferred to the slave device, in which case the third signal 94 will also be synchronised with the reference timebase. In certain embodiments the transmitter 92 is operatively associated with the slave device 6 by means of a link 90, that may for example be a coaxial cable or a data cable, over which the slave device provides for example a frequency reference such as a 10 MHz reference signal, plus pulse-per-second (PPS) and time information. As such, the slave device 6 is acting in analogous fashion to the optional external frequency reference 22 described above with regard to FIG. 1.

Improving Accuracy of Nominal Synchronisation

According to another aspect of the invention, and again with reference to FIG. 1, an exchange of signals between a slave device 6 and a reference device 10 is used to improve the accuracy of the synchronisation process described in U.S. Pat. No. 7,616,682. In particular, it allows the reference device 10 to detect and transmit corrections for a time residual, or synchronisation error, arising from an inaccurately assumed a priori value for the propagation delay for the reference signal 8 used by the slave device 6. It will be recalled that in the prior art a slave device calculates the reference signal propagation delay by dividing the inter-device distance 12 by the speed of light. Consequently, errors can arise from inaccuracies in the assumed distance, e.g. because of multipath or surveying errors, or inaccuracies in the assumed signal speed, e.g. because of tropospheric delay.

In this aspect of the invention it is assumed that the slave device 6 has nominally synchronised its signal 4 to the timebase of the reference device 10, via the procedure set forth in U.S. Pat. No. 7,616,682, using an assumed or nominal value for the reference signal propagation delay. This nominal value may be of greater or lesser accuracy, derived for example from a value for the inter-device distance 12 obtained from surveyed device antenna locations or approximate map coordinates. However any inaccuracy will result in a time residual or synchronisation error between the slave signal 4 and the reference device timebase, which remains after the slave device has followed the 'nominal' synchronisation procedure. Once this time residual or synchronisation error has been identified or determined, it can be corrected or compensated for, thereby improving the accuracy of the synchronisation.

To this end, the CPU 18 of the reference device 10 is configured with non-transitory machine-readable program code for monitoring the slave signal 4. Similar to Stage 4 of the previously described embodiment, the reference device 10 receives the nominally synchronised slave signal 4 as well as the reference signal 8, as represented by the feedback loop 44 enabled by imperfect isolation at the Tx/Rx switch 38 or some other form of selective signal routing component, and samples the signals 8, 4 in its receiver 16 for interpretation in the reference CPU 18. The reference CPU measures a time difference between one or more of the carrier phase, PRN and data components of the reference and slave signals 8, 4. A time residual between the slave signal 4 and the reference device timebase can be calculated from this measured time difference. If the slave device 6 has broadcast its location, or included its nominal value for the reference signal propagation delay in its signal 4, or otherwise communicated this nominal value, the reference device 10 can determine the time residual by subtracting the nominal propagation delay from the measured time difference and dividing the result by an appropriate scaling factor, generally equal to approximately two when the slave and reference signals 4, 8 traverse symmetric paths. The reference device 10 can then broadcast the time residual, typically by including it in the data component of its signal 8. In other embodiments the reference device 10 broadcasts the measured time difference, allowing the slave device 6 or another recipient device to calculate the time residual. In yet other embodiments the calculation is split between the two devices. For example the reference device 10 may broadcast the time difference minus propagation delay result and allow the slave device 6 to apply the appropriate scaling factor. Once the slave device 6 has received or calculated the time residual it can adjust the generation of its signal 4 accordingly, similar to Stage 5 of the previously described embodiment, thereby improving the accuracy of the synchronisation to the reference device timebase. In certain embodiments the exchange of signals is repeated one or more times, e.g. until the time residual is below a predetermined threshold.

Figure 6:
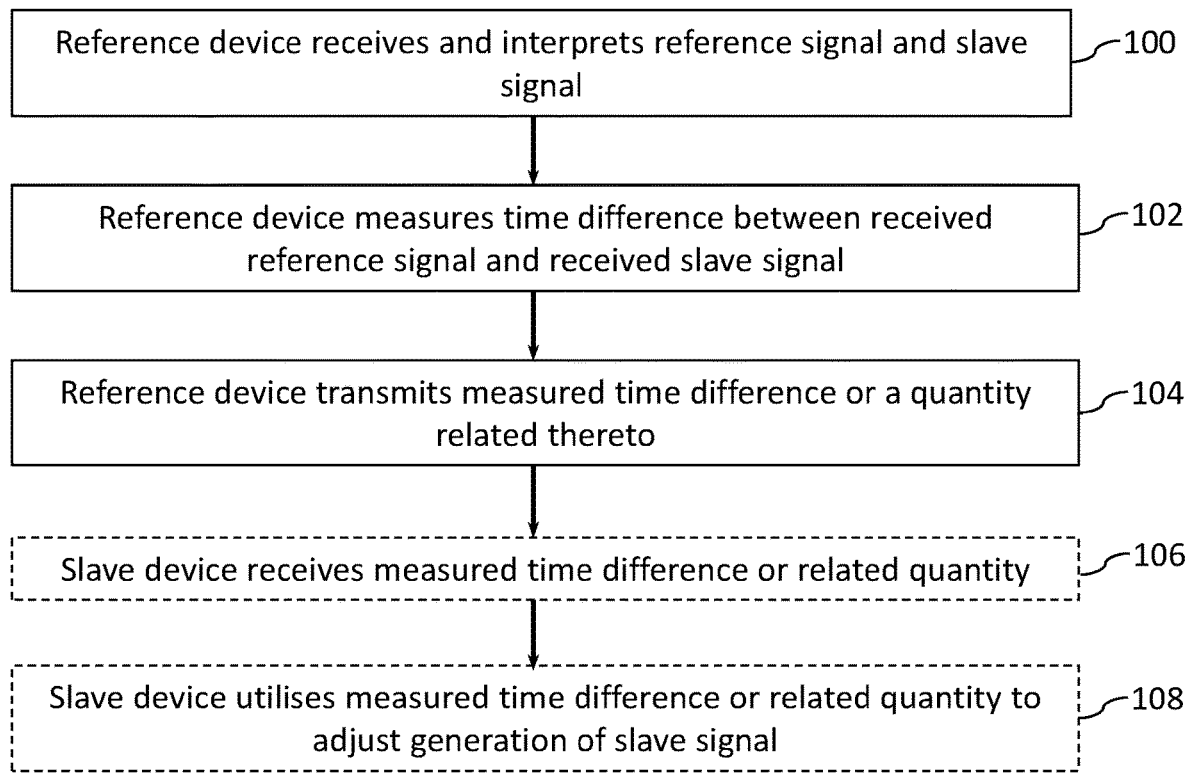
FIG. 6 shows a flowchart depicting a method for identifying a time residual between a signal of a slave device and the timebase of a reference device, after the slave device has nominally synchronised its signal to the reference device timebase using a nominal value for the reference signal propagation delay.

A method for identifying a time residual between a slave device signal and a timebase of a reference device, once the slave device has nominally synchronised its signal to the reference device timebase using a nominal value for the reference signal propagation delay, is summarised in the flowchart of FIG. 6. Additional optional steps are shown in dashed boxes. In step 100 the reference device receives and interprets the reference signal and the nominally synchronised slave signal in separate channels, and in step 102 the reference device measures a time difference between the received reference signal and the received nominally synchronised slave signal. Noting that the time residual can be calculated from the measured time difference, in step 104 the reference device transmits the measured time difference or a quantity related thereto. This enables a recipient device to correct or compensate for the time residual. In a preferred embodiment the slave device receives the measured time difference or related quantity in step 106, then utilises the measured time difference or related quantity to adjust the generation of its signal in step 108, thereby improving the synchronisation of its signal to the reference device timebase. In other embodiments the measured time difference or related quantity transmitted by the reference device 10 is utilised by another slave device to compensate for the time residual when performing its own synchronisation procedure. In yet other embodiments, and with reference to FIG. 7, the measured time difference or related quantity can be used by a roving position receiver 70 to compensate for the time residual when using signals 4-1 from an imperfectly synchronised 'slave' positioning-unit device 6-1 in a position solution.

Although the method for identifying a time residual summarised in FIG. 6 has been described in terms of the wireless-based configuration shown in FIG. 1, it is also applicable to configurations in which the reference and slave devices 10, 6 communicate via a fixed line, e.g. as shown in FIG. 3. In this case the exchange of signals can identify a time residual arising for example from the slave device's imperfect knowledge of the length of the fixed line 78 or the propagation speed of signals along the fixed line.

In certain embodiments the slave device 6 broadcasts, e.g. in the data component of its signal 4, that it is in a 'nominally synchronised' state while waiting for further information from the reference device 10. After the slave device 6 has adjusted the generation of its signal 4 using information received from the reference device 10 it can declare synchronisation. The slave signal 4 can then be used by other devices seeking to join the network, or by roving position receivers for calculating position solutions.

In location networks where a given reference device 10 is communicating with or tracking multiple 'slave' positioning-unit devices 6, the reference device 10 will generally include device identification for the relevant 'slave' positioning-unit device 6 with the measured time difference or related quantity.

As in the previously described embodiments, the reference device 10 can continue to monitor the slave device 6 after the slave has declared synchronisation, to correct drift of the slave signal 4 with respect to the reference device timebase that may for example be caused by environmental variations, e.g. changes in tropospheric delay for wireless transmission, or temperature-induced changes in link length or signal propagation speed for fixed line transmission. For example the reference device 10 can continually or periodically measure phase or time differences between the reference and slave signals 8, 4, and periodically transmit phase or time corrections to the slave device 6. The slave device can then apply these phase or time corrections to adjust the generation of the slave signal 4 using any of the previously described techniques.

Although the invention has been described with reference to specific examples, it will be appreciated by those skilled in the art that the invention may be embodied in many other forms.

What is claimed is:

1. A method for synchronising a second signal generated and transmitted by a second device to a timebase of a first device, said method comprising the steps of:
   (i) said first device generating and transmitting a first signal comprising first time information indicating the time of transmission of said first signal according to the timebase of said first device;
   (ii) said second device:
      (a) receiving and interpreting said first signal;
      (b) generating and transmitting said second signal comprising second time information indicating the time of transmission of said second signal;
      (c) receiving and interpreting said second signal;
      (d) calculating a first time difference between said first time information and said second time information; and
      (e) adjusting the generation of said second signal according to said first time difference, thereby adjusting said second signal and said second time information;
   (iii) said first device:
      (a) receiving and interpreting said first signal and the adjusted second signal;
      (b) calculating a second time difference between said first time information and the adjusted second time information; and
      (c) transmitting said second time difference, or a quantity related thereto; and
   (iv) said second device:
      (a) receiving said second time difference or the related quantity and obtaining therefrom a measure of the propagation delay of said first signal; and
      (b) adjusting the generation of said second signal according to said measure of said propagation delay, thereby synchronising said second signal to said timebase.

2. The method according to claim 1, wherein step (ii) (e) comprises adjusting the generation of said second signal so as to minimise the difference between the first time information and the second time information.

3. The method according to claim 1, further comprising the steps of said first device after said second signal has been synchronised to said timebase:
   receiving and interpreting said second signal and said first signal;
   measuring a phase or time difference between the received and interpreted first and second signals; and
   transmitting the measured phase or time difference or a related quantity,
   such that said second device can adjust the generation of said second signal to mitigate the effect on the synchronisation of said second signal to said timebase of environment-related variations in the propagation of said first signal.

4. The method according to claim 3, wherein said second device adjusts the generation of said second signal according to the measured phase or time difference or related quantity.

5. The method according to claim 1, wherein said first and second signals are transmitted between said first and second devices via a fixed line.

6. The method according to claim 5, wherein said fixed line comprises a coaxial cable or an optical fibre.

7. The method according to claim 5, further comprising the step of broadcasting, from a transmitter operatively associated with said second device, a third signal that is synchronised with said timebase.

8. An apparatus for synchronising a second signal generated and transmitted by a second device to a timebase of a first device, said apparatus comprising:
   a first device configured to generate and transmit a first signal comprising first time information indicating the time of transmission of said first signal according to a timebase of said first device; and
   a second device configured to:
      receive and interpret said first signal;
      generate and transmit a second signal comprising second time information indicating the time of transmission of said second signal;
      receive and interpret said second signal;
      calculate a first time difference between said first time information and said second time information; and
      adjust the generation of said second signal according to said first time difference, thereby adjusting said second signal and said second time information;
   wherein said first device is further configured to:
      receive and interpret said first signal and the adjusted second signal;
      calculate a second time difference between said first time information and the adjusted second time information; and
      transmit said second time difference, or a quantity related thereto;
   and wherein said second device is further configured to:
      receive said second time difference or the related quantity and obtain therefrom a measure of the propagation delay of said first signal; and
      adjust the generation of said second signal according to said measure of said propagation delay,
   thereby synchronising said second signal to said timebase.

9. The apparatus according to claim 8, wherein said second device is configured to adjust the generation of said second signal according to said first time difference so as to minimise the difference between the first time information and the second time information.

10. The apparatus according to claim 8, wherein said first device is configured to, after said second signal has been synchronised to said timebase:
   receive and interpret said second signal and said first signal;
   measure a phase or time difference between the received and interpreted first and second signals; and transmit the measured phase or time difference or a related quantity, such that said second device can adjust the generation of said second signal to mitigate the effect on the synchronisation of said second signal to said timebase of environment-related variations in the propagation of said first signal.

11. The apparatus according to claim 10, wherein said second device is configured to adjust the generation of said second signal according to the measured phase or time difference or related quantity.

12. The apparatus according to claim 8, wherein said first and second devices are configured to transmit and receive said first and second signals via a fixed line connecting said first and second devices.

13. The apparatus according to claim 12, wherein said fixed line comprises a coaxial cable or an optical fibre.

14. The apparatus according to claim 12, further comprising a transmitter operatively associated with said second device, for broadcasting a third signal that is synchronised with said timebase.

15. An article of manufacture comprising a non-transitory computer useable medium having a computer readable program code configured to conduct the method according to claim 1.

16. An article of manufacture comprising a non-transitory computer useable medium having a computer readable program code configured to operate the apparatus according to claim 8.

* * * * *